(12) United States Patent
Robinson

(10) Patent No.: US 11,760,581 B2
(45) Date of Patent: Sep. 19, 2023

(54) CONVEYOR BELT CLEANING APPARATUS

(71) Applicant: Australian Conveyor Components Pty Ltd, Maleny (AU)

(72) Inventor: Lawrence Harvey Robinson, Maleny (AU)

(73) Assignee: AUSTRALIAN CONVEYOR COMPONENTS PTY LTD, Maleny (AU)

( * ) Notice: Subject to any disclaimer, the term of this patent is extended or adjusted under 35 U.S.C. 154(b) by 0 days.

(21) Appl. No.: 17/758,374

(22) PCT Filed: Jan. 6, 2021

(86) PCT No.: PCT/AU2021/050003
§ 371 (c)(1),
(2) Date: Jul. 5, 2022

(87) PCT Pub. No.: WO2021/138712
PCT Pub. Date: Jul. 15, 2021

(65) Prior Publication Data
US 2023/0057901 A1 Feb. 23, 2023

(30) Foreign Application Priority Data
Jan. 6, 2020 (AU) ................................ 2020900018

(51) Int. Cl.
*B65G 45/24* (2006.01)
*B65G 45/14* (2006.01)
(Continued)

(52) U.S. Cl.
CPC .............. *B65G 45/24* (2013.01); *B65G 45/14* (2013.01); *B65G 45/16* (2013.01); *B65G 45/22* (2013.01); *B65G 2203/0266* (2013.01)

(58) Field of Classification Search
CPC ........ B65G 45/24; B65G 45/14; B65G 45/16; B65G 45/22; B65G 2203/0266;
(Continued)

(56) References Cited

U.S. PATENT DOCUMENTS 4,290,520 A    9/1981   Rhodes
5,213,197 A *  5/1993   Mohri ................... B65G 45/16
                                                        198/499

(Continued)

FOREIGN PATENT DOCUMENTS

AU      655950 B2    1/1995
WO      9304959 A1   8/1991
(Continued)

OTHER PUBLICATIONS

PCT International Search Report and Written Opinion issued for international application No. PCT/AU2021/050003, dated Mar. 16, 2021, 14 pages.

*Primary Examiner* — Mark A Deuble
(74) *Attorney, Agent, or Firm* — Snyder, Clark, Lesch & Chung, LLP

(57) ABSTRACT

A cleaning assembly for cleaning a conveyor belt comprising: a base member adapted to be mounted relative to the conveyor belt; and a blade mounting assembly associated with the base member and adapted for mounting a scraper blade thereto, wherein the blade mounting assembly is configured for rotational movement relative to the base member, wherein the cleaning assembly is configured to maintain the scraper blade in abutment with the conveyor belt. A conveyor belt cleaning apparatus comprising: a plurality of cleaning assemblies, each of the plurality of cleaning assemblies comprising: a base member associated with the elongate support member, and a blade mounting assembly associated with the base member and adapted for mounting a scraper blade thereto, wherein the blade mount- (Continued)

ing assembly is configured for rotational movement relative to the base member; and an elongate support member, wherein each of the plurality of cleaning assemblies is adapted to maintain the respective scraper blades in abutment with a conveyor belt.

13 Claims, 10 Drawing Sheets

(51) Int. Cl.
*B65G 45/16* (2006.01)
*B65G 45/22* (2006.01)

(58) Field of Classification Search
CPC   B65G 2207/30; B65G 45/12; B65G 2203/02; B08B 3/022; B08B 1/005
See application file for complete search history.

(56) References Cited

U.S. PATENT DOCUMENTS

| | | | | |
|---|---|---|---|---|
| 5,722,528 | A * | 3/1998 | Dolan | B65G 45/16 |
| | | | | 198/499 |
| 6,041,913 | A * | 3/2000 | Dolan | B65G 45/16 |
| | | | | 198/497 |
| 6,227,350 | B1 * | 5/2001 | Yoshizako | B65G 45/12 |
| | | | | 15/256.5 |
| 7,740,127 | B2 * | 6/2010 | Swinderman | B65G 45/16 |
| | | | | 198/499 |

FOREIGN PATENT DOCUMENTS

| | | |
|---|---|---|
| WO | 2005113394 A1 | 5/2004 |
| WO | 2008027732 A2 | 8/2006 |

\* cited by examiner

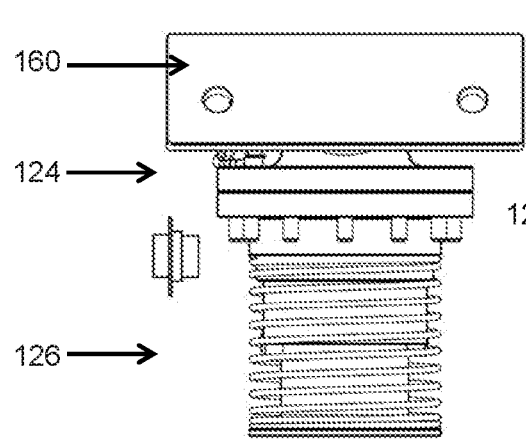
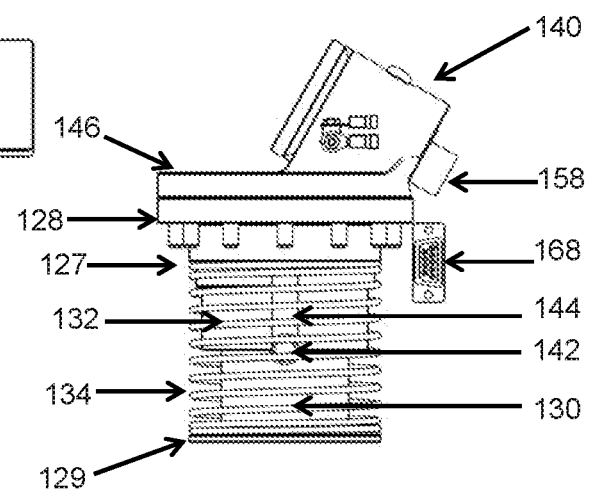
Figure 5A          Figure 5B
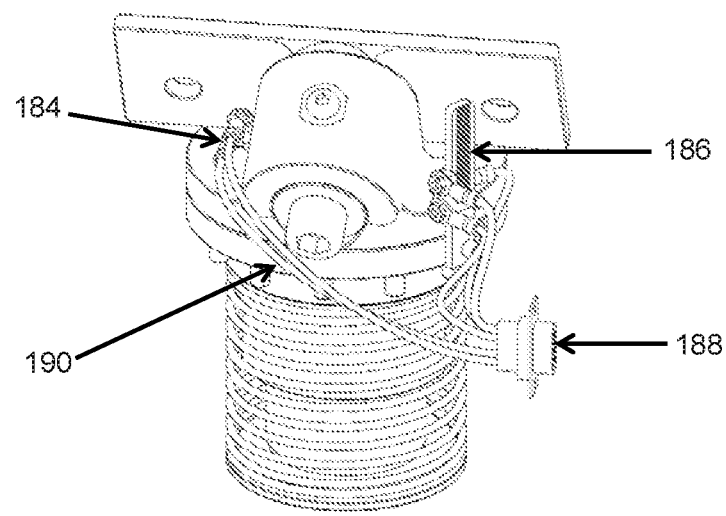
Figure 6

CONVEYOR BELT CLEANING APPARATUS

TECHNICAL FIELD

The present invention relates to a conveyor belt cleaning apparatus and a cleaning assembly for a cleaning a conveyor belt.

BACKGROUND ART

Conveyor belt cleaners are used to remove unwanted material from a conveyor belt. Such unwanted material may be residual material carried on, or stuck to, the belt after the bulk of material is discharged from the belt at a main discharge. For instance, coal particles and/or coal slurry may stick to conveyor belts after crushed coal is discharged from the belt. In order to remove the residual material from the conveyor belt, a conveyor belt cleaner or scraper may be used.

A conventional conveyor belt cleaner includes an elongate rail extending transversely across the conveyor belt and a plurality of cleaning blades mounted to the rail. The cleaning blades are substantially fixed in position relative to the direction of travel of the conveyor belt and force is applied to the elongate rail to bias the cleaning blades against the conveyor belt. Accordingly, as the conveyor belt moves past the cleaning blades, the residual material carried by the conveyor belt is removed. However, as the conveyor belt wears, more force must be applied to the rail to make the blades contact the conveyor belt.

Some conveyor belt cleaners use tensioners to apply force to the rail. However, the force is applied to the elongate rail evenly and as the conveyor belt tends to wear unevenly and the material handled tends to be distributed towards the middle of the belt, portions of the conveyor belt may be subjected to greater force than required, causing premature wear of the conveyor belt. While resilient cushions and flexible blades allow enough deflection to allow individual tips to deflect whilst maintain the scraping edge of the tip to remain in contact with the belt, the alignment of the cleaning blade with the worn belt, the amount of tension on individual tips, or the angle of the tip relative to the worn belt may not be ideal and the conveyor belt cleaner may not clean as effectively or the tip may damage the conveyor belt.

While some conveyor belt cleaners may provide for an individual response by a single cleaning blade, by providing a mechanical or air spring, or a pneumatic or hydraulic connection to individual cleaning blades, these solutions do not ensure that the cleaning blade may be maintained in contact with the conveyor belt at all times, or in contact with the conveyor belt at an angle to provide the most effective cleaning of the conveyor belt.

Thus, there would be an advantage if it were possible to provide a conveyor belt cleaning apparatus that provided the correct alignment, tension and angle of the cleaning blade relative to the conveyor belt.

It will be clearly understood that, if a prior art publication is referred to herein, this reference does not constitute an admission that the publication forms part of the common general knowledge in the art in Australia or in any other country.

SUMMARY OF INVENTION

The present invention is directed to a conveyor belt cleaning apparatus and a cleaning assembly for a cleaning a conveyor belt which may at least partially overcome at least one of the abovementioned disadvantages or provide the consumer with a useful or commercial choice.

With the foregoing in view, the present invention in one form, resides broadly in a conveyor belt cleaning apparatus comprising:

a plurality of cleaning assemblies, each of the plurality of cleaning assemblies comprising:

a base member associated with the elongate support member, and a blade mounting assembly associated with the base member and adapted for mounting a scraper blade thereto, wherein the blade mounting assembly is configured for rotational movement relative to the base member, and an elongate support member, wherein each of the plurality of cleaning assemblies is adapted to maintain the respective scraper blades in abutment with a conveyor belt.

The conveyor belt cleaning apparatus may be of any suitable, size, shape, or configuration. Preferably, the conveyor belt cleaning apparatus is of sufficient size and configuration to remove unwanted material from a conveyor belt. However, it will be understood that the size, shape and configuration of the conveyor belt cleaning apparatus may vary depending on a number of factors, such as the size and type of conveyor belt to be cleaned, the type of material to be removed from the conveyor belt and the amount of space available. In use, it is envisaged that a plurality of conveyor belt cleaning assemblies may be used to remove material from a conveyor belt. In an embodiment of the invention, one or more of the same type of conveyor belt cleaning apparatus may be used. In an alternative embodiment of the invention, one or more different types of conveyor belt cleaning assemblies may be used.

The conveyor belt cleaning apparatus may be located in any suitable position relative to the conveyor belt. For instance, the conveyor belt cleaning apparatus may be positioned under the return side of a conveyor belt, above the conveyor belt, at an end of a conveyor belt, and the like. Preferably, the conveyor belt cleaning apparatus may be positioned under the return side of a conveyor belt.

The conveyor belt cleaning apparatus may be configured to extend transversely across a conveyor belt. In use, it is envisaged that the conveyor belt cleaning apparatus may be mounted at opposing ends thereof to a mount configured to position the conveyor belt cleaning apparatus across a conveyor belt. Thus, it is envisaged that the conveyor belt cleaning apparatus may extend substantially transversely to the direction of travel of the conveyor belt. For instance, the conveyor belt cleaning apparatus may be mounted to a housing associated with the conveyor belt, may be mounted to a structure associated with the conveyor belt, may be suspended from a structure supporting the conveyor belt, may be mounted to a supporting frame and/or legs, and any suitable combination thereof.

The conveyor belt cleaning apparatus may be accessed through an access opening in a structure supporting the conveyor belt. Any suitable access opening may be provided. For instance, the access opening may be an aperture, a door, a hatch, or the like. Preferably, the access opening may be sufficiently large to enable an operator to inspect the conveyor belt cleaning operation, remove and/or replace the conveyor belt cleaning apparatus, or operate or access pumps, sensors, gauges, valves, and the like. In some embodiments of the invention, the conveyor belt cleaning apparatus may be removable from the structure supporting the conveyor belt. In this instance, it is envisaged that the conveyor belt cleaning apparatus may be removed via an access opening in the structure supporting the conveyor belt.

The conveyor belt cleaning apparatus comprises an elongate support member. The elongate support member may be of any suitable size, shape or configuration. In a preferred embodiment of the invention, the elongate support member may be of sufficient length that it may extend at least the width of the conveyor belt. Preferably, the elongate support member may extend beyond the lateral sides of the conveyor belt. Thus, it is envisaged that the elongate member may extend substantially transversely to the direction of travel of the conveyor belt. The elongate support member may be configured for movement relative to the one or more mounts to which the conveyor belt cleaning apparatus may be attached, may be configured to be stationary relative to the one or more mounts to which the conveyor belt cleaning apparatus may be attached, or a portion of the elongate support member may be configured for movement relative to the one or more mounts to which the conveyor belt cleaning apparatus may be attached and a second portion of the elongate support member may be configured to be stationary relative the one or more mounts to which the conveyor belt cleaning apparatus may be attached. The elongate support member may be configured for any suitable movement relative to the one or more mounts. For instance, the elongate support member may be configured for lateral movement relative to the mounts (e.g. movement parallel to the direction of travel of the conveyor belt), vertical movement relative to the mounts and/or rotational movement relative to the mounts. Preferably, the elongate support member may be configured to be stationary relative to the structure to which the conveyor belt cleaning apparatus may be attached.

The elongate support member may be of any suitable cross-sectional shape. For instance, the elongate support member may have a substantially circular, oval, stadium, rectangular, square, or polygon cross-section. However, it will be understood that the cross-sectional shape of the elongate support member may vary depending on a number of factors, such as whether the elongate support member may need to rotate about its axis or is stationary, the type of cleaning assemblies used and how the cleaning assemblies may be associated with the elongate support member. However, it is envisaged that a least a portion of the cleaning assemblies and at least a portion of the elongate support member may comprise cooperating shapes.

The elongate support member may be fabricated from any suitable material or combinations of materials. Preferably, the elongate support member may be fabricated from a material of sufficient mechanical properties (strength, rigidity, shape, etc.) to provide the required tension to the cleaning assembly without deforming and to contain a pressurised fluid therein. For instance, the elongate support member may be fabricated from metal, such as, but not limited to, aluminium (including honeycomb aluminium, high tensile aluminium alloys, extruded aluminium, etc.), steel (including powder-coated steel, galvanised steel, extruded steel, stainless steel, etc.), or a polymeric materials, or plastic, and in particular, a relatively durable plastic such as nylon, polyamides, polycarbonate, polyethylene, polypropylene, polystyrene, polyvinyl chloride, acrylonitrile butadiene styrene and the like, or any suitable combination thereof. It is envisaged that at least a portion of the elongate support member may be fabricated from a polymeric material.

The elongate support member may comprise a first end and an opposed second end and a bore extending at least part way through the elongate support member between the first end to the second end. In some embodiments of the invention, the bore may extend all the way through the elongate support member from the first end to the second end thereof. Thus, it is envisaged that the bore may comprise a pair of open ends, one open end and one closed end, or a pair of closed ends. In some embodiments of the invention, the bore may be configured to comprise one or more conduits therein. The conduits may be of any suitable type. For instance, a fluid, such as a liquid or gas (such as air), may flow through the conduits. Alternatively, the conduits may carry cables, hoses or the like, such as, but not limited optical cable, electrical wiring, hoses, pipes and/or other connectors.

In a preferred embodiment of the invention, the bore and/or one or more conduits in the bore, may be in fluid communication with a source of fluid. In particular, the bore and/or one more conduits in the bore may be in fluid communication with a source of pressurised fluid. Any suitable fluid may be used, although in a preferred embodiment of the invention, the fluid may comprise a pneumatic or hydraulic fluid. Any suitable source of fluid may be provided, such as a gas cylinder or the like. More preferably, the source of fluid may comprise a fluid reservoir. In a specific embodiment of the invention, the source of fluid may comprise one or more accumulators, such as hydraulic accumulators, hydro-pneumatic accumulators or the like. In use, it is envisaged that the elongate support member may be a source of pressurised fluid for each of the plurality of cleaning assemblies. In this instance, it is envisaged that the elongate support member may provide pressurised fluid to the cleaning assembly each of the plurality of cleaning assemblies may be individually pressurised.

The conveyor belt cleaning apparatus may comprise a plurality of cleaning assemblies. Preferably, the cleaning assemblies may be used for a cleaning a conveyor belt. Any suitable number of cleaning assemblies may be used. However, it will be understood that the number of cleaning assemblies used may vary depending on a number of factors, such as the size, shape and configuration of the cleaning assemblies, the size, shape and configuration of the elongate support member and the size, type and configuration of the conveyor belt to be cleaned.

The plurality of cleaning assemblies may be associated with the elongate support member. The cleaning assemblies may be associated with the elongate support member by any suitable means. For instance, the cleaning assemblies may be configured to be mounted to the elongate support member, may be configured to receive at least a portion of the elongate support member therein, may be configured to be at least partially received within the elongate support member, or any suitable combination thereof. Preferably, however, the means by which the cleaning assemblies may be associated with the elongate support member may be sufficient to maintain the cleaning assembly in connection with the elongate support member and remain in fluid communication during operation of the conveyor belt cleaning apparatus.

Each of the plurality of cleaning assemblies may comprise a base member. Preferably, the cleaning assemblies may be associated with the elongate support member via a base member. The base member may be associated with the elongate support member by any suitable means. For instance, the base member may be configured to be mounted to the elongate support member, may be configured to receive at least a portion of the elongate support member therein, may be configured to be at least partially received within the elongate support member, or any suitable combination thereof.

In a preferred embodiment of the invention, the base member may be configured to be at least partially received within a portion of the elongate support member. Preferably, the elongate support member may comprise one or more bores that extend transversely to the longitudinal axis of the elongate support member. The size, shape and configuration of the transverse bores may be substantially the same as the size, shape and configuration of the base member of the cleaning assembly. Preferably, the size, shape and configuration of the transverse bores may be substantially the same as the size, shape and configuration of the lower region of the base member. In this instance, it is envisaged that the transverse bores of the elongate support member may be adapted to receive and retain at least a portion of the base member of the cleaning assembly therein. Preferably, the base member of the cleaning assembly may be removably received and retained within the transverse bores of the elongate support member.

The base member may be of any suitable size, shape or configuration. Preferably, however, the base member may be of sufficient size and shape to maintain a scraper blade in abutment with the conveyor belt. In an embodiment of the invention, the base member may comprise an upper region and a lower region, wherein the lower region of the base member may be associated with the elongate support member and wherein the upper region of the base member may be associated with a blade mounting assembly. In an embodiment of the invention, the upper region and the lower region of the base member may be a unitary structure. In a preferred embodiment of the invention, the upper region and the lower region of the base member may be two or more separate portions, wherein the two or more portions may be adapted for fixed or temporary attachment to one another. Preferably, the upper region and the lower region of the base member may be two or more cooperating portions.

The base member may be fabricated from any suitable material or combinations of materials. Preferably, however, the base member may be fabricated from a material with sufficient mechanical properties (strength, rigidity, shape, etc.) to provide the required tension to the cleaning assembly without deforming. For instance, the base member may be fabricated from metal, such as, but not limited to, steel (including powder-coated steel, galvanised steel, extruded steel, stainless steel, mild steel, etc.), aluminium (including high tensile aluminium alloys, extruded aluminium, etc.) or a polymeric material such as, but not limited to, nylon, polyamides, polycarbonate, polyethylene, polypropylene, polystyrene, polyvinyl chloride, acrylonitrile butadiene styrene and the like, or any suitable combination thereof. In an embodiment of the invention, the upper region and the lower region of the base member may be fabricated from the same type of material. In an alternative embodiment of the invention, the upper region and the lower region of the base member may be fabricated from different types of materials.

The lower region of the base member may be of any suitable size, shape or configuration. Preferably, however, the lower region of the base member may be of sufficient size, shape or configuration so as to be at least partially received and retained within a transverse bore in the elongate support member and to resist compressive forces exerted by contact of the conveyor belt with the cleaning assembly. In a preferred embodiment of the invention, the lower region of the base member may be cylindrical or substantially cylindrical in configuration.

Preferably, the lower region of the base member comprises a body portion, the body portion comprising a first end and an opposed second end and a bore extending at least part way through the body portion from the first end to the second end. The body portion may comprise a bore extending substantially all of the way through the body portion from the first end to the second end. Thus, it is envisaged that the bore of the body portion may comprise a pair of open ends, or one open end and one closed end. In use, it is envisaged that the bore may be configured to receive at least a portion of the upper region of the base member therein. In this instance, it is envisaged that the bore of the body portion may comprise at least one open end.

Preferably, at least the end of the lower region of the base member extending outwardly from the transverse bore in the elongate support member may be provided with a flange. The flange may be located on an external surface of the lower region of the base member, or located at the end of the lower region of the base member. It is envisaged that in use, the flange may provide a surface to which the upper region of the base member may be attached.

Preferably, the lower region of the base member may be biased using one or more biasing members. Any suitable biasing members may be used, such as, but not limited to, one or more pieces of compressible material. In an embodiment of the invention, the biasing member may be a spring member. Preferably, the biasing member may be a return spring member, wherein the return spring member biases the upper region of the base member into a retracted condition. Preferably, the biasing member may be under preload compression. In use, it is envisaged that compression in the biasing member increases as the actuation device is pressurised and reduces to its preload compression levels as the actuation device depressurises. In use, it is envisaged that the spring member may be arranged so as to force the upper region of the base member to retract towards the lower region of the base member and consequential movement of the blade mounting assembly along the same axis as the pressure on the actuation device is relieved.

In an embodiment of the invention, the biasing member bears against both the lower region of the base member and a surface of the transverse bore in the elongate support member. The biasing member may bear against any suitable surface of the lower region. For instance, the bearing surface may be a flange, an undercut, a stepped portion, or the like. In an embodiment of the invention, the flange may provide a bearing surface against which the biasing member may be seated. In an alternative embodiment of the invention, a stepped portion in the body portion of may provide a bearing surface against which the biasing member may be seated. In a preferred embodiment of the invention, the lower region of the base member may be provided with a pair of opposing surfaces, between which the biasing member may be located such that it bears against the pair of opposing surfaces.

In an alternative embodiment of the invention, a lower region of the base member may be configured to mount the base member to the elongate support member. Preferably, the base member may be removably mounted to the elongate support member. The base member may be mounted to the elongate support member by any suitable means. For instance, the base member may be slidably engaged with the elongate support member, may be attached to an outer surface of the elongate support member by one or more locking members, or may be retained in frictional engagement, for instance by providing complementary male-female connection portions, and the like. It is envisaged that, in use, the locking members prevent each of the cleaning assemblies from independent movement relative to the elongate support member.

In an alternative embodiment of the invention, the base member may be slidably engaged with the elongate support member. Preferably, the base member may comprise an opening in a lower region thereof, wherein the opening may be configured to receive at least a portion of the elongate support member. The opening may comprise a first open end and an opposed second open end and a bore extending through the base member from the first open end to the second open end. The bore may be of any suitable dimensions. For instance, the width or diameter of the bore may be substantially constant along its length or may vary along its length. Preferably, however the size, shape and configuration of the opening may be substantially the same as the size, shape and configuration of the elongate support member. In this instance, it is envisaged that the lower region of the base member may substantially form a collar, ring or the like, which is adapted to receive and retain at least a portion of the elongate support member therein.

The lower region of the base member may be a unitary structure. Alternatively, the lower region of the base member may be formed from two or more portions, wherein the two or more portions may be fastened together using one or more mechanical fasteners (screws, bolts, pins, latch, or the like). Alternatively, the two or more portions may be fastened together by frictional engagement, or by providing complementary screw-threaded portions, press fittings, snap fit features, male-female connectors or the like. In an embodiment of the invention, the two or more portions may be formed by splitting the base member in the region of the opening, from the first end of the opening to the opposed second end of the opening, such that the bore of the opening may be exposed. In an embodiment of the invention, the cross-section of the inner surface of the bore in each portion of the base member may be symmetrical. Alternatively, the cross-section of the inner surface of the bore of each portion of the base member may be non-symmetrical. It is envisaged that by providing the base member with a lower region having two or more portions, the cleaning assembly may be more easily fitted to and removed from the elongate support member when the cleaning assembly needs to be removed or replaced.

In an embodiment of the invention wherein the base member may be configured to be mounted onto the elongate support member, it is envisaged that an operator may slide the base member onto the elongate support member until it is in the desired position along the length of the elongate support member. The operator may then rotate the base member relative to the elongate support member until the scraper blade is in the desired position relative to the conveyor belt and fasten the base member to the elongate support member. Alternatively, the base member may comprise two or more cooperating portions, wherein in use the operator may separate the two or more cooperating portions of the base member, position a first portion of the base member on the elongate support member at the desired position along the length of the elongate member and fasten a second portion of the base member to the first portion of the base member.

The base member may be provided with a locking member to fasten the base member to the elongate support member when the base member is engaged with the elongate support member. It is envisaged that the locking member substantially precludes the base member from moving relative to the elongate support member when in use. Preferably, the locking member may retain the base member in removable engagement with the elongate support member. For instance, the base member and the elongate support member may be provided with one or more apertures, that when aligned, a locking member may be inserted to fasten the base member to the elongate support member. Any suitable locking member may be used. For instance, the locking member may comprise a mechanical fastener such as a lock pin, a threaded bolt, a split pin, or the like. In an alternative embodiment, the base member may be provided with an aperture through which a set screw may be screwed so as to engage with a surface of the elongate support member. In a preferred embodiment of the invention, the base member may be provided with at least one locking member configured to engage with at least one receiving portion of the elongate support member to retain the base member in removable attachment with the elongate support member. Preferably, the base member may be provided with a cam lock, linkage lock, or easily accessible retaining bolts. In use, it is envisaged that fastening the base member to the elongate support member may assist in forming a seal between the base member and the elongate support member whilst allowing an operator to swap out assemblies safely and quickly when the cleaning assembly requires replacement.

In an embodiment of the invention wherein the base member may be configured to be mounted onto the elongate support member, the bore of the opening in the base member may be provided with one or more annular grooves configured to receive a sealing member therein. In this instance, it is envisaged that a sealing member (such an O-ring, a gasket, or the like) may be positioned in the annular groove of the opening so as to reduce or eliminate the ingress of water and debris (dust, dirt, etc.) into a gap between the elongate support member and the bore of the opening. The one or more annular grooves may be axially spaced along the length of the bore. The sealing members may also be provided in order to provide a seal so that hydraulic or pneumatic fluid is substantially precluded from leaking between the base member and the elongate support member. In this way the pressure of the hydraulic or pneumatic fluid within the base member may be maintained.

As previously stated, the upper region and the lower region of the base member may be two or more separate portions, wherein the upper region and the lower region of the base member may be fastened together using one or more mechanical fasteners (screws, bolts, pins, latch, or the like). Alternatively, the upper region and the lower region of the base member may be fastened together by frictional engagement, or by providing complementary screw-threaded portions, press fittings, snap fit features, male-female connectors of the like. In a preferred embodiment of the invention, the upper region and the lower region of the base member may be fastened together using one or more mechanical fasteners.

The base member of each cleaning assembly may comprise an actuation device. Any suitable type of actuation device may be used. For instance, the actuation device may be a pneumatic actuator, a hydraulic actuator, an electric actuator, or a spring actuator. Preferably, the actuation device may be pressurised by the pressurised fluid located in the elongate support member.

Preferably, however, the actuation device is configured to provide linear motion. Preferably, actuation of the actuation device results in linear movement of the blade mounting assembly relative to the base member. It is envisaged that in use, actuation of the actuation device causes the actuation device to extend, resulting in linear movement of the upper region of the base member relative to the lower region of the base member and consequential movement of the blade mounting assembly along the same axis. In this way, it is envisaged that actuation of the actuation device helps maintain tension of the scraping blade relative to the conveyor belt. In some embodiments of the invention, the actuation device may comprise a piston, ram, gas strut or the like. The actuation device may be provided with one or more bleed screws and one or more sealing members to maintain pressure of the hydraulic or pneumatic fluid within the actuation device.

Actuation of the actuation device may be automatic, manual, or a combination of the two. The actuation device may be actuated continuously, periodically, or on as-needs basis determined by an operator or in response to a signal or alert generated by one or more sensors associated with the conveyor belt. Preferably, however actuation of the actuation device may help maintain correct alignment and tip tension of each of the blade mounting assemblies relative to the conveyor belt. Thus, actuation of the actuation device may result in a blade mount assembly moving substantially upwardly towards the conveyor belt or substantially downwardly towards the elongate support member.

The upper region of the base member may comprise a housing portion. In use, it is envisaged that the housing portion may be configured to at least partially retain the actuation device therein and be acted upon by the actuation device. For instance, it is envisaged that the actuation device may abut an upper portion of the housing portion and actuation of the actuation device may result in linear movement of the housing portion relative to the lower region of the base member. The housing portion may be provided in order to protect the base member (and more specifically, the actuation device) from the ingress of contaminants such as dirt, dust or the like, or from the impact of material removed from the conveyor.

It is envisaged that the upper region of the base member may be precluded from separating fully from the lower region of the base member or rotating relative thereto when the cleaning assembly is in abutment with the conveyor belt. This may be achieved using any suitable technique. For instance, one or more stop members may be provided on a surface of the lower region of the base member, extending outwardly therefrom, which may engage with at least a portion of the upper region of the base member, preventing the upper region from separating fully from the lower region of the base member. Alternatively, the upper region of the base member may be provided with a retaining member (such as a strap, a tie, a clip, a clasp, an elastomeric member, or the like) that provides limited movement of the upper region of the base member relative to the lower region of the base member. For instance, the actuation device may be provided with a locking section that limits the extension of the actuation device. For instance, the upper region of the base member may be provided with a projection or a pin member extending outwardly therefrom configured to engage with a recess located in the lower region of the base member that substantially precludes rotation of the upper region relative to the lower region. In this instance, it is envisaged that the recess may be a longitudinally extending groove, wherein in use, the projection may move along the length of the recess without substantial lateral movement as the base member extends or compresses.

The actuation device may be in fluid communication with an accumulator, such as, but not limited to, a hydraulic accumulator or a pneumatic-hydraulic accumulator. In use, it is envisaged that the accumulator may help maintain pressure in each individual actuation device.

The upper region of the base member may comprise a mounting portion. Any suitable mounting portion may be used. Preferably, however, the configuration of the mounting portion may enable the blade mounting assembly to be mounted thereon and facilitate the rotational movement of the blade mounting assembly relative to the base member. In an embodiment of the invention, the mounting portion of the base member and a connection portion of the blade mounting assembly may be provided with complementary connection portions. For instance, the mounting portion may comprise a projection configured to be received within a portion of the blade mounting assembly, or the mounting portion may be configured to receive at least a portion of the blade mounting assembly therein, and so on. In a particular embodiment of the invention, the mounting portion may comprise a collar, ring or the like, adapted to receive and retain at least a portion of the blade mounting assembly and allow rotational movement of the blade mounting assembly relative thereto. In some embodiments of the invention, the mounting portion may include or comprise a bearing (such as a wing bearing).

The mounting portion may be located on any suitable portion of the upper region of the base member. Preferably, however, the mounting portion may be provided on a portion of the housing portion which facilitates the rotational movement of the blade mounting assembly. For instance, the mounting portion may be provided on a side of the base member, an upper surface of the base member, and the like. Preferably, the mounting portion may be provided on the housing portion. Yet more preferably, the mounting portion may be provided on an upper surface of the housing portion.

Each of the plurality of cleaning assemblies may comprise a blade mounting assembly. The blade mounting assembly may be of any suitable size, shape or configuration. Preferably, however the blade mounting assembly is of sufficient size and shape to maintain a scraper blade in abutment with the conveyor belt.

The blade mounting assembly may be associated with the base member. In a preferred embodiment of the invention, the blade mounting assembly may be associated with an upper region of the base member. Preferably, a connection portion of the blade mounting assembly may be associated with the mounting portion of the base member. The blade mounting assembly may be associated with the base member by any suitable means. For instance, the connection portion of the blade mounting assembly may be fastened to the mounting portion of the base member using one or more mechanical fasteners (screws, bolts, rivets, pins, or the like), an adhesive, a heat or chemical treatment, or welded using any suitable technique. Alternatively, the connection portion of the blade mounting assembly and the mounting portion of the base member may be connected together by frictional engagement, or by providing complementary screw-threaded portions, press fittings, snap fit features, male-female connectors, or the like. Preferably, the blade mounting assembly may be associated with the base member by a means which facilitates the rotational movement of the blade mounting assembly relative to the base member.

The blade mounting assembly may comprise an adjustment member. Any suitable adjustment member may be used. For instance, the adjustment member may be hydraulic or pneumatically actuated, may be screw threadedly engaged with the connection portion of the blade mounting assembly, and the like. Preferably, however, the adjustment portion may be configured to provide the blade mounting assembly with rotational movement relative to the base member. In this way, it is envisaged that movement of the blade mounting assembly may assist in maintaining correct alignment of the scraper blades relative to the conveyor belt.

It is envisaged that in use, the adjustment member facilitates the rotational movement of the blade mounting assembly relative to the base member. Rotation of the blade mounting assembly may be achieved manually, may be driven by a motor, may be actuated by an actuation device, may be actuated by contact with a conveyor belt, or the like. The blade mounting assembly may be rotated periodically, or on an as-needs basis determined by an operator or in response to a signal or alert generated by one or more sensors associated with the conveyor belt. In this instance, it is envisaged that adjustment member may actively alter the configuration of the blade mounting assembly.

Alternatively, the blade mounting assembly may be self-compensating and rotated in response to a configuration of the conveyor belt. For instance, the blade mounting assembly may rotate to a first configuration when the scraper blade contacts a first profile of the conveyor belt and rotate to a second configuration when the scraper blade contacts a second profile of the conveyor belt. In this instance, it is envisaged that the adjustment member may provide passive support to the blade mounting assembly, allowing the scraper blade to conform to minor irregularities and movement in the conveyor belt and reducing likelihood of damage to the conveyor belt. Preferably, however rotation of the blade mounting assembly may help maintain correct alignment and tip tension to the conveyor belt. In use, it is envisaged as the upper region of the base member extends relative to the lower region of the base member due to pressurisation of the actuation device, a portion of the scraper blade contacts the conveyor belt, the blade mounting assembly may rotate about the adjustment member such that substantially the length of the scraper blade conforms to the wear profile of the conveyor belt. The linear movement pushes the scraper blade into the conveyor belt and the increased tension causes the scraper blade to flex backwards about the resilient member which, changes the attack angle for each respective cleaning assembly.

The blade mounting assembly may be adapted for mounting a scraper blade thereto. The blade mounting assembly may be adapted for mounting a scraper blade by any suitable means. Preferably, however, the blade mounting assembly mounts the scraper blade in a position such that the scraper blade may contact the conveyor belt transversely across its direction of travel.

The blade mounting assembly may rotate any suitable distance relative to the base portion. In use, it is envisaged that the blade mounting assembly may rotate about the adjustment member. It is envisaged that, in some embodiments of the invention, the blade mounting assembly may rotate up to 20° angle relative to the base portion. More preferably, the blade mounting assembly may rotate up to 10° angle relative to the mounting portion. In this embodiment of the invention, it is envisaged that the blade mounting assembly may rotate up to 10° angle in any direction. More preferably, however, it is envisaged that the blade mounting assembly may rotate up to 5° angle either side of the vertical. In this instance, it is envisaged that the rotational movement of the blade mounting assembly may be described as a rocking motion and assists in aligning the scraper blade with the conveyor belt.

In an embodiment of the invention, the blade mounting assembly may comprise a blade mount member to which a scraper blade may be mounted. The blade mount member may be of any suitable form, although in a preferred embodiment of the invention, the blade mount member may be in the form of a plate. Preferably, the blade mount member may be adapted for connection to the connection portion at or adjacent a first end thereof, while the blade mount member may be adapted for connection to the scraper blade at or adjacent an opposed second end thereof. In a preferred embodiment of the invention, the scraper blade may be attached to an upper region of the blade mount member. In this instance, it is envisaged that the scraper blade may at least partially extend above the upper end of the blade mount member. Preferably, the scraper blade may be attached to an upper region of the blade mount member and the connection portion may be attached to a lower region of the blade mount member.

The scraper blades may be positioned at any suitable orientation. Preferably, however, the scraper blades extend substantially parallel to the elongate support member (and therefore substantially transverse to the direction of travel of the conveyor belt. Thus, it is envisaged that the blade mounting assembly may rotate about an axis that is approximately parallel to the direction of travel of the conveyor belt and therefore approximately transverse to the elongate support member. It is envisaged that the diagonally opposed position of the scraper blade on the mounting member relative to the connection portion provides the cleaning assembly with a larger range of rotational movement about the elongate support member to achieve the correct alignment and tip tension relative to the conveyor belt.

The mounting member may be of any suitable size, shape or configuration. For instance, the mounting member may have a substantially circular, oval, stadium, rectangular, square, or polygon cross-section. Preferably, however the mounting member is of sufficient size, shape and configuration to support the mounting of the scraper blade on one surface thereof and the connection portion on an opposed surface thereof. In an embodiment of the invention, the mounting member may be an elongate member. In a preferred embodiment of the invention, the mounting member may have a square or rectangular cross-section. Preferably, the width of the mounting member may be substantially the same as the width of the scraper blade. In an embodiment of the invention, the width of the mounting member may extend at least the width of the scraper blade. In an alternative embodiment of the invention, the width of the mounting member may not extend beyond the width of the scraper blade.

The scraper blade may be configured for attachment to the blade mounting assembly. The scraper blade may be attached to the blade mounting assembly in any suitable manner. Preferably, the scraper blade may be attached in a manner such that it may be substantially precluded from movement relative to the blade mounting assembly. For instance, the scraper blade may be attached to the blade mounting assembly using one or more mechanical fasteners (such as screws, bolts, rivets, pins, or the like), an adhesive, a heat or chemical treatment (such as vulcanisation), or may be welded to the frame using any suitable technique. In an embodiment of the invention, the scraper blade may be attached to the mounting member of the blade mounting assembly.

In a preferred embodiment of the invention, the scraper blade may be attached to the blade mounting assembly in order to provide to form a desired angle between the tip of the scraper blade and the conveyor belt (i.e. the attack angle). This may be achieved in any suitable manner. However, in a preferred embodiment of the invention, the mounting member may be provided at an angle to the base portion and/or the connection portion that, when a scraper blade is connected thereto, orients the scraper blade at the desired attack angle to the conveyor belt.

The scraper blade may be fabricated from any suitable material or combinations of materials. For instance, the scraper blade may be fabricated from a metal or metal alloy (such as a steel material, a carbide alloy, and the like), a rubber or polymeric material (such as, but not limited to, rubber, silicone rubber, polyurethane, nylon, polyamides, polyethylene, polypropylene, and the like), or any suitable combination thereof. Preferably, however, the scraper blade may be fabricated from a relatively wear-resistant material. The scraper blade may be a unitary structure. Alternatively, the scraper blade may be formed from two or more portions, wherein each of the two or more portions may be separately attached to the blade mounting assembly. In some embodiments of the invention, the two or more portions of the scraper blade may be attached to one or more adjacent portions.

The cleaning assembly may comprise at least one resilient member. Preferably, the at least one resilient member may be associated with the blade mounting assembly. The resilient member may be associated with the blade mounting assembly in any suitable manner. For instance, the resilient member may be positioned between the scraper blade and the mounting member, between the mounting member and the connection portion, and any suitable combination thereof. In use, it is envisaged that the resilient member may provide yielding support to the scraper blade, allowing the scraper blade to conform to minor irregularities and movement in the conveyor belt and reducing likelihood of damage to the conveyor belt, the scraper blade and/or the blade mounting assembly.

The resilient member may be fabricated from any suitable material or combinations of materials. For instance, the resilient member may be fabricated from an elastomeric or polymeric material (such as rubber, silicone rubber, and the like). Preferably, however, the resilient member may be fabricated from a relatively resilient material.

The conveyor belt cleaning apparatus may be provided with one or more sensors or other measuring devices. Any suitable sensor or measuring device may be used. For instance, the sensor may include one or more pressure sensors, wear sensors, impact sensors, temperature sensors, or the like. Preferably, each cleaning assembly may be provided with a pressure sensor. In this instance, it is envisaged that the tension of the cleaning blade relative to the conveyor belt may be monitored and analysed whilst the conveyor is in operation. Preferably, each cleaning assembly may be provided with a linear rail and sensor. In this instance, it is envisaged that the belt wear and scraper blade wear may be monitored and analysed whilst the conveyor is in operation.

The one or more sensors or other measuring devices may be associated with an external computing device. The one or more sensors or other measuring devices may be physically connected to the external computing device (for instance, by being attached via one or more cables, wires, cords or the like) or indirectly connected to one another via a communication portion, wherein the communication portion may provide an interface between the one or more sensors or other measuring devices and the external computing device. In other embodiments of the invention, the one or more sensors or other measuring devices and the external computing device may be in wireless communication with one another, such as by Wi-Fi, Bluetooth, or the like.

The computing device may be of any suitable type. For instance, the computing device may comprise a computer, mobile telephone, computing tablet, smart watch or the like, or any suitable combination thereof. In other embodiments, the computing device may comprise a control system (DCS, SCADA, or the like), expert system and so on. In other embodiments, the computing device may comprise a control panel located adjacent to the conveyor. The control panel may comprise a display on which measurements taken by the sensors or other measuring devices may be displayed for an operator to review.

As previously stated, the base member may be provided with an actuation device. The actuation device may be self-contained or may be in fluid communication with a supply of pneumatic or hydraulic fluid.

The conveyor belt cleaning apparatus may be provided with a means of supplying pneumatic or hydraulic fluid to an actuation device located in the base member. For instance, the conveyor belt cleaning apparatus may be provided with one or more conduits directly connected to an actuation device fluid inlet, a rotary manifold, a manifold assembly located in the bore of the elongate support member, a manifold assembly located on a surface of the conveyor cleaning apparatus, an accumulator, or the like.

In an embodiment of the invention, the conveyor belt cleaning apparatus may be in fluid communication with an accumulator. Preferably, the elongate support member portion may be in fluid communication with an accumulator. Any suitable accumulator may be used. For instance, the accumulator may be a hydraulic accumulator, a gas-charged accumulator, a spring-loaded accumulator, a raised weight accumulator, and the like. Preferably, however, the accumulator may help maintain pressure in a hydraulic system. By providing an accumulator in fluid communication with each cleaning assembly, it is envisaged that the pressure of the fluid in each cleaning assembly will be substantially similar, such that each cleaning assembly applies the same tension to the respective scraper blades. In an embodiment of the invention, the accumulator may be in fluid communication with a conveyor belt cleaning apparatus via a manifold.

The elongate support member may be configured to connect to an actuation device fluid inlet. In use, it is envisaged that the actuation device fluid inlet may be located at an end of the actuation device. Any suitable means of connection may be provided. For instance, the elongate support member may be connected to an actuation device fluid inlet by a conduit, may be in direct contact, and the like. Preferably, the elongate support member may comprise a fluid outlet configured to connect with the actuation device fluid inlet, such that the elongate support member may be in fluid communication with the cleaning assembly. Preferably, the fluid outlet in the elongate support member may be provided with a sealing member, such as an O-ring or a gasket to maintain pressure of the hydraulic or pneumatic fluid within the actuation device and/or the elongate support member.

In an embodiment of the invention, the elongate support member may be connected to an actuation device fluid inlet by a conduit. The conduit may be located in the bore of the elongate support member, may pass through a portion of the transverse bore configured to receive the base member of the cleaning assembly therein, or may pass through the elongate support member from an outer surface thereof.

In an embodiment of the invention wherein the base member may be configured to be mounted onto the elongate support member, the elongate support member may be configured for rotational movement relative to the conveyor belt. In this instance, it is envisaged that rotational movement of the elongate support member results in a corresponding movement of each cleaning assembly mounted to the elongate support member. In use, it is envisaged that rotation of the elongate support member may adjust the attack angle of the scraper blade. In an embodiment of the invention, a support member fluid outlet may be in fluid communication with a base member fluid inlet. Preferably, the fluid outlet in the elongate support member may be provided with a sealing member, such as an O-ring or a gasket to maintain pressure of the hydraulic or pneumatic fluid within the base member. Alternatively, one or more sealing members located in the one or more annular grooves of the opening of the base member may form a sealed chamber between the outer surface of the elongate support member and the inner surface of the bore of the base member. In this instance, it is envisaged that the sealing members may act as a fluid communication pathway between the elongate support member and an actuation device fluid inlet. Alternatively, the elongate support member may comprise an annular recess located on a surface thereof. In this instance, it is envisaged that when the elongate support member is received in the opening of the base member, the annular recess may substantially align with an actuation device fluid inlet. Alternatively, the elongate support member may be a rotary manifold, or a rotary manifold may be located in the bore of the elongate support member. The rotational movement of the elongate support member may be actuated automatically, manually, or a combination of the two. The rotational movement of the elongate support member may be actuated continuously, periodically, or on as-needs basis determined by an operator or in response to a signal or alert generated by one or more sensors associated with the conveyor belt. Preferably, however actuation of the rotational movement of the elongate support member may help maintain the correct attack angle of each of the blade mounting assemblies relative to the conveyor belt.

In an embodiment of the invention, the accumulator may be provided with a hand operable pump. The hand operable pump may be located at an end of the elongate support member. It is envisaged that in use, the hand operable pump may allow an operator to pressurise the accumulator and/or the conveyor belt cleaning apparatus.

The base member may be provided with a base member cover. In use, it is envisaged that the base member cover may reduce or eliminate the ingress of water and debris (dust, dirt, etc.) into the base member. The base member cover may be fabricated from any suitable material or combination of materials. For instance, the base member cover may be fabricated from a metal or metal alloy, a polymeric material, or any suitable combination thereof. Preferably, the base member cover may be fabricated from a relatively durable polymeric material such as, but not limited to, polycarbonate, polyethylene, polypropylene, polystyrene, polyvinyl chloride, acrylonitrile butadiene styrene and the like, or any suitable combination thereof.

The conveyor belt cleaning apparatus may be provided with a cleaning assembly cover, configured to substantially cover the cleaning assembly. In use, it is envisaged that the cleaning assembly cover may reduce or eliminate the ingress of water and debris (dust, dirt, etc.) into the cleaning assembly. In this instance, it is envisaged that at least a portion of the blade mounting portion may project outwardly from the cleaning assembly cover such that the scraper blade may be retained in contact with a portion of the conveyor belt.

The cleaning assembly may be provided with a protective bellows, or gasket, such that the protective bellows prevents ingress of water and debris into the base member and/or into the transverse bore in the elongate support member.

The conveyor belt cleaning apparatus may be provided with one or more cleaning equipment articles, such as a brush cleaner, an air knife, a spray bar, a V-plough or return plough, or the like. In an embodiment of the invention, the conveyor belt cleaning apparatus may be provided with a spray bar, wherein the spray bar comprises one or more nozzles configured to disperse a liquid across the belt surface during the cleaning operation.

The conveyor belt cleaning apparatus may be provided with one or more stabilising or hold down rollers, wherein the stabilising rollers are configured to hold the conveyor belt flat and stable to optimise belt contact with the scraper blades.

In a second aspect, the invention resides broadly in a cleaning assembly for cleaning a conveyor belt comprising:
 a base member adapted to be mounted relative to the conveyor belt; and
 a blade mounting assembly associated with the base member and adapted for mounting a scraper blade thereto, wherein the blade mounting assembly is configured for rotational movement relative to the base member,
wherein the cleaning assembly is configured to maintain the scraper blade in abutment with the conveyor belt.

Preferably, the cleaning assembly is the cleaning assembly according to a first aspect of the invention.

Preferably, the base member is the base member according to a first aspect of the invention.

Preferably, the blade mounting assembly is the blade mounting assembly according to a first aspect of the invention.

Preferably, the scraper blade is the scraper blade according to a first aspect of the invention.

The present invention provides numerous advantages over the prior art. For instance, the present invention allows each individual cleaning assembly to maintain contact with the conveyor belt at the optimum tip tension, alignment and attack angle for that cleaning assembly in order to effectively clean the conveyor belt. In addition, as each of the cleaning assemblies self-compensates for changes in conveyor belt profile through movement of the base member and the blade mounting assembly, it provides for more effective cleaning of a worn conveyor belt. The present invention also enables an operator to adjust the attack angle of the scraper blade of each cleaning assembly relative to the conveyor belt by adjusting the elongate support member relative to the frame in addition to adjusting the scraper blade and resilient member of each of the cleaning assemblies before use.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 5A shows a front view of a base member for a cleaning assembly according to an embodiment of the invention;

FIG. 5B shows a side view of a base member for a cleaning assembly according to an embodiment of the invention;

FIG. 6 shows a rear view of a base member for a cleaning assembly according to an embodiment of the invention;

FIGS. 8A-C shows a front view of a conveyor belt cleaning apparatus according to an embodiment of the invention in use;

DESCRIPTION OF EMBODIMENTS

Figure 1:
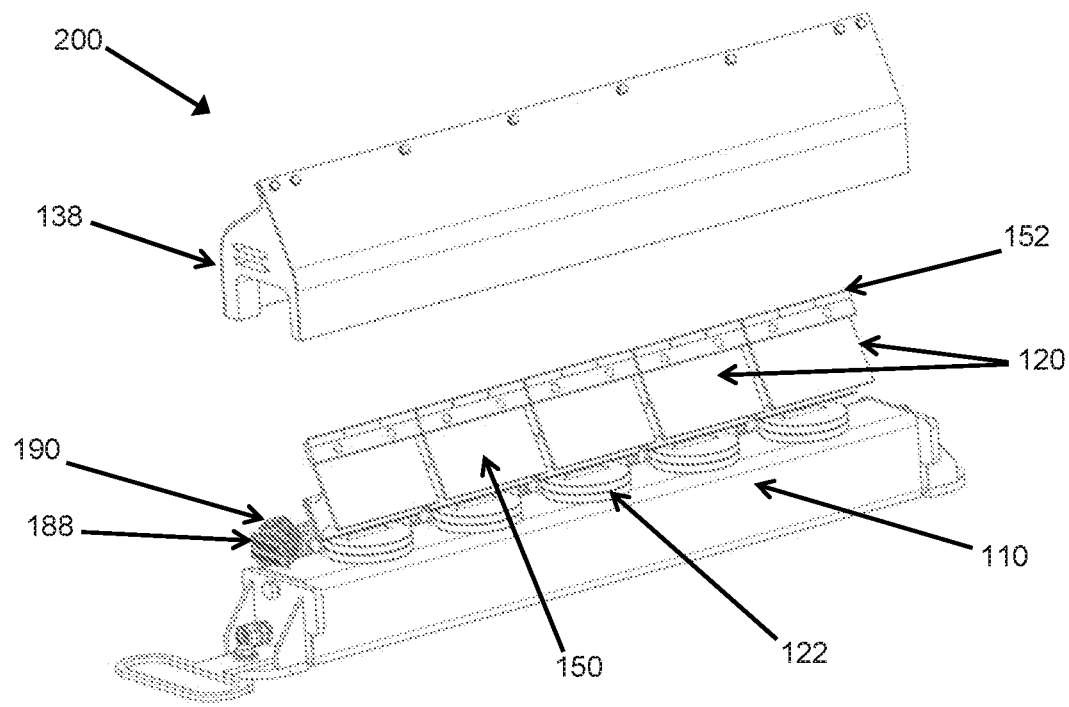
FIG. 1 shows a front perspective view of a conveyor belt cleaning apparatus according to an embodiment of the invention.
Figure 2:
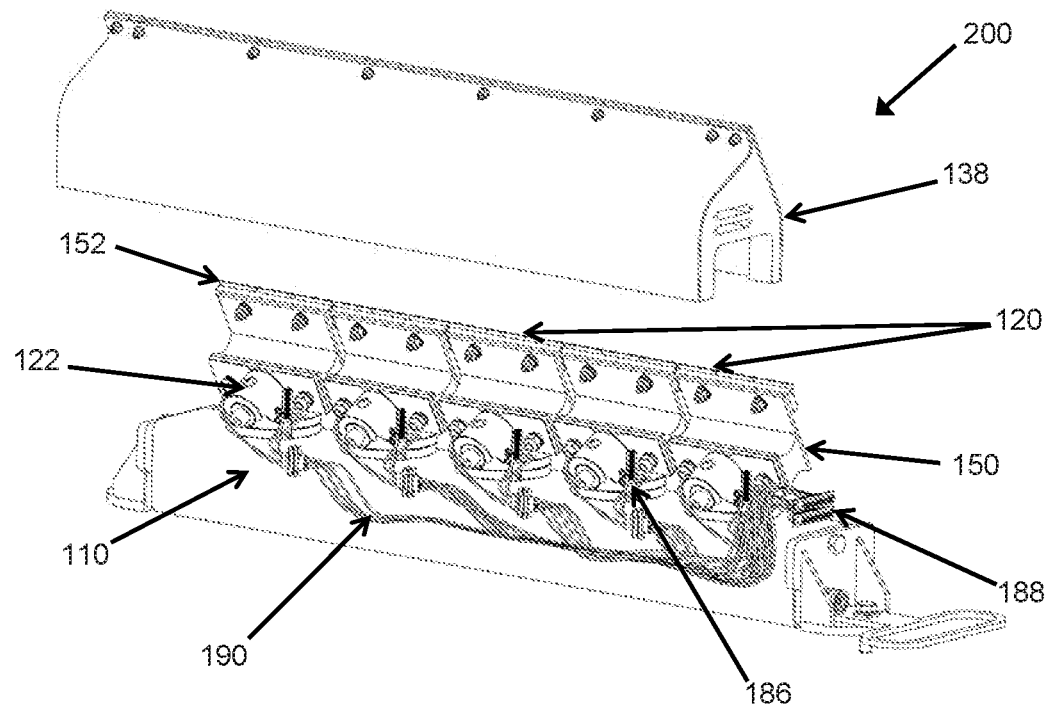
FIG. 2 shows a rear perspective view of a conveyor belt cleaning apparatus according to an embodiment of the invention.

In FIGS. 1 and 2, a partially exploded view of conveyor belt cleaning apparatus 200 according to an embodiment of the invention is shown. Conveyor belt cleaning apparatus 200 comprises an elongate support member 110 and a plurality of cleaning assemblies 120 and a cleaning assembly cover 138. Each of the plurality of cleaning assemblies 120 comprises a base member 122 associated with the elongate support member 110, and a blade mounting assembly 150 associated with the base member 122 and adapted for mounting a scraper blade 152 thereto, wherein the blade mounting assembly 150 is configured for rotational movement relative to the base member 122, and wherein each of the plurality of cleaning assemblies 120 is adapted to maintain the respective scraper blades 152 in abutment with a conveyor belt (not shown).

Each of the cleaning assemblies 120 is provided with a pressure sensor 184 to monitor hydraulic oil pressure and a linear rail and sensor 186 to monitor wear in the scraper blade 152 and conveyor belt (not shown). Each sensor or measuring device 184, 186 is connected to one or more electrical ports 188 located at one end of the elongate support member 110 via one or more cables, wires or cords 190 and indirectly connected to a control room monitor (not shown). In use, it is envisaged that an operator may use the diagnostic data to determine if the cleaning assembly is operating within parameters for normal wear and tear, beyond preset parameters indicating the conveyor belt or scraper blade needs replacing, below preset parameters indicating the cleaning assembly or accumulator may have a leak, or the like.

Figure 3:
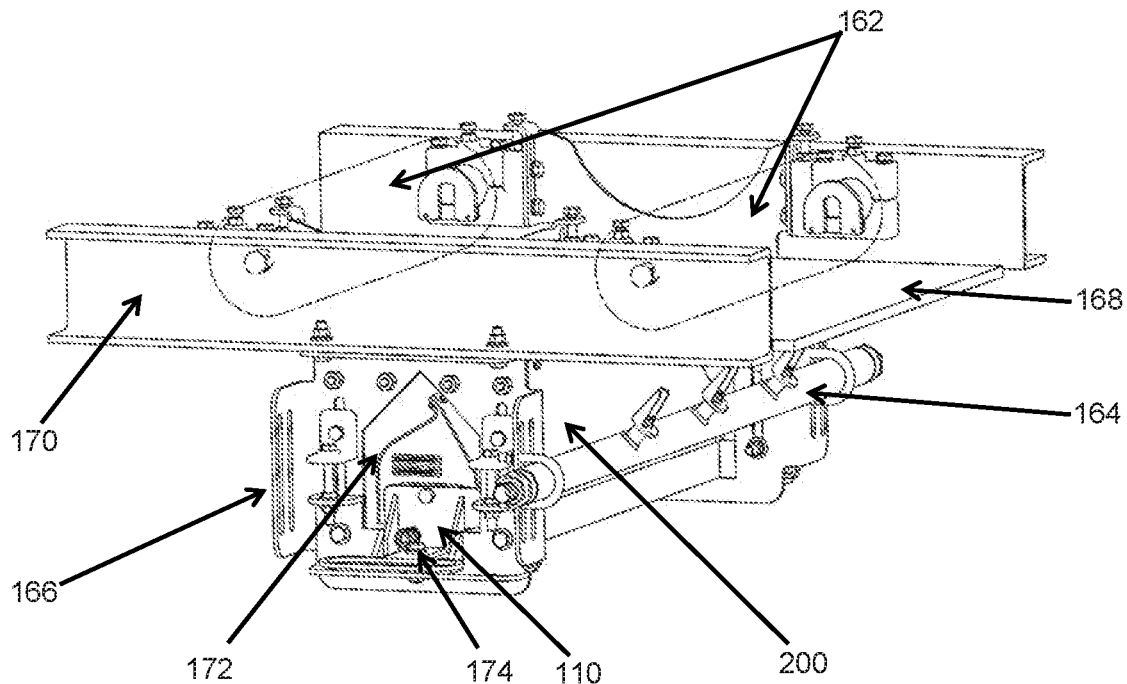
FIG. 3 shows a side perspective view of a conveyor belt cleaning apparatus according to an embodiment of the invention.

In FIG. 3, a conveyor belt cleaning apparatus 200 is shown in situ in a structure 170 supporting a conveyor belt 168. Conveyor belt cleaning apparatus 200 is located in a frame 166 and accessible by access opening 172. A spray bar 164 with nozzles for dispersing a liquid onto a lower surface of conveyor belt 168 is attached to frame 166. Hold down rollers 162 are attached to an upper portion of structure 170 such that the rollers hold the conveyor belt flat and stable to optimise belt contact with the scraper blades (not shown) of conveyor belt cleaning apparatus 200. Support member fluid inlet 174 is located at an end of elongate support member 110 and is configured to provide hydraulic fluid to each cleaning assembly (not shown).

Figure 4:
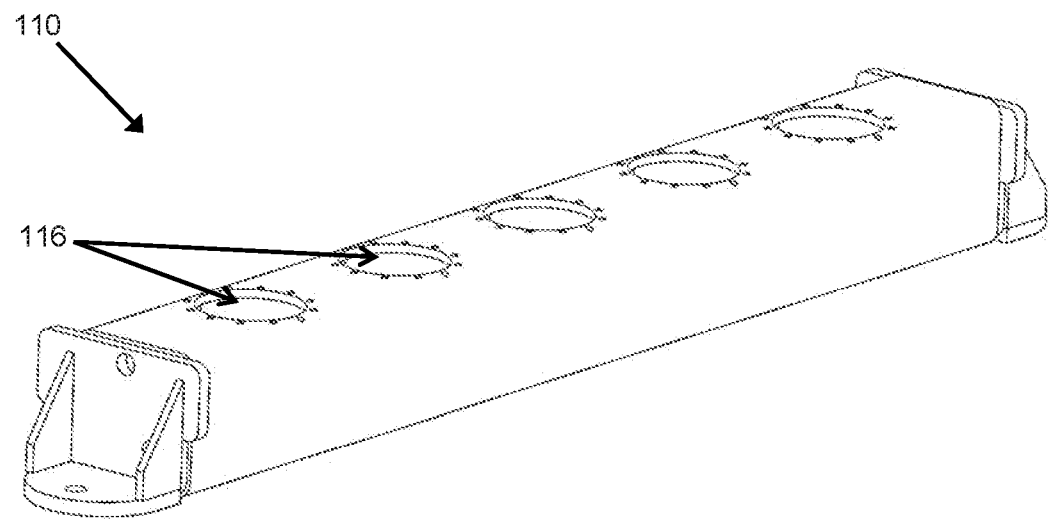
FIG. 4 shows a front perspective view of an elongate support member according to an embodiment of the invention.
Figure 7:
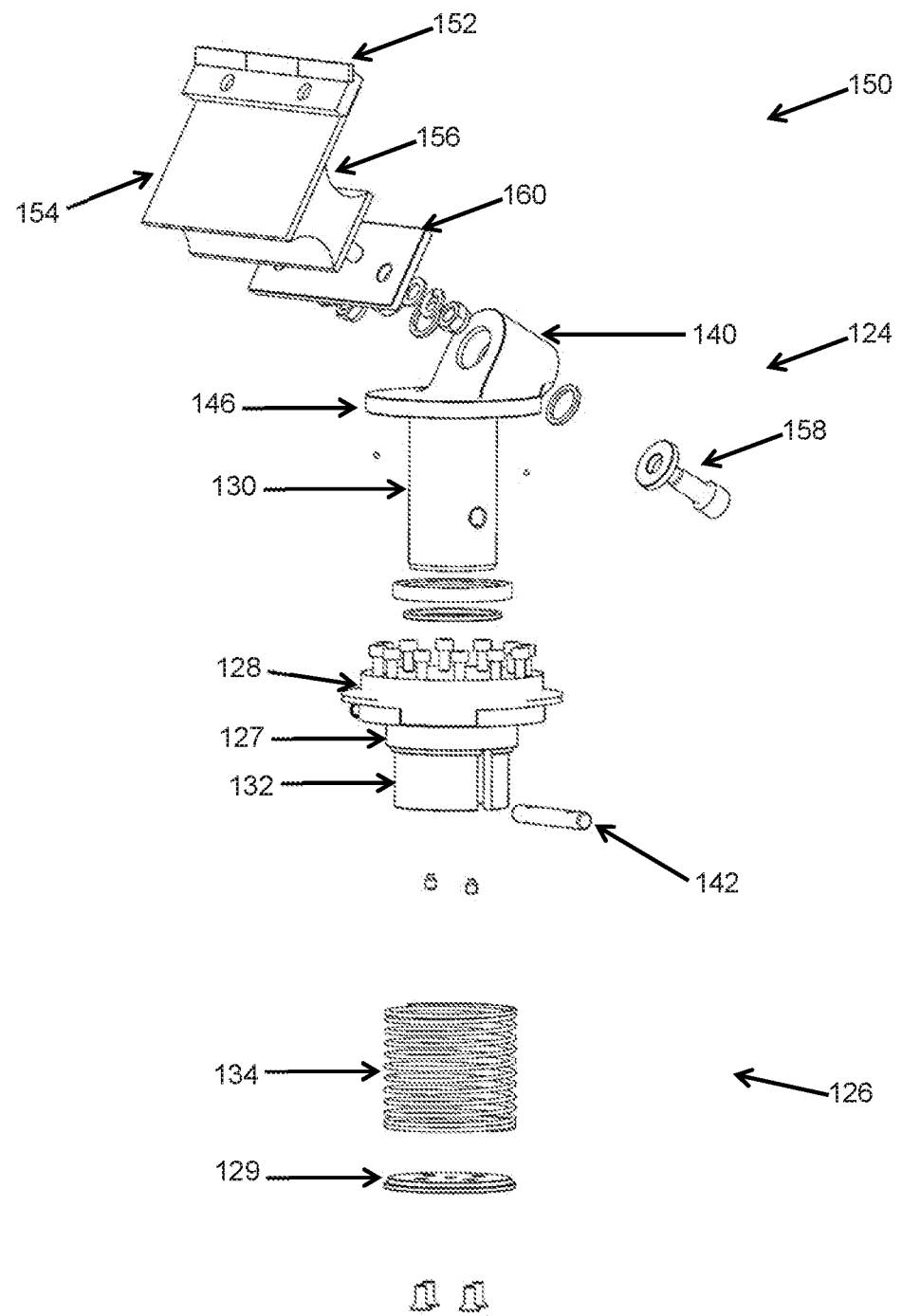
FIG. 7 shows an exploded front perspective view of a cleaning assembly according to an embodiment of the invention.

In FIG. 4, an elongate support member 110 for a conveyor belt cleaning apparatus according to an embodiment of the invention is shown. Elongate support member 110 comprises one or more transverse bores 116 extending transversely to the longitudinal axis of the elongate support member 110, wherein the transverse bores 116 are adapted to receive and retain at least a portion of the base member of the cleaning assembly (not shown) therein. Elongate support member 110 may comprise a bore configured to supply a pressurised fluid to a cleaning assembly (not shown) received within the one or more transverse bores 116 located in the elongate support member. Elongate support member 110 is supplied by an accumulator connected to a pressure inlet (not shown) located at an end of the elongate support member 110.

In FIGS. 5A, 5B, 6 and 7, components of a cleaning assembly 120 for cleaning a conveyor belt according to an embodiment of the invention is shown. Cleaning assembly 120 comprises a base member 122 adapted to be mounted relative to the conveyor belt (not shown) and a blade mounting assembly 150 associated with the base member 122 and adapted for mounting a scraper blade 152 thereto, wherein the blade mounting assembly 150 is configured for rotational movement relative to the base member 122 and wherein the cleaning assembly 120 is configured to maintain the scraper blade 152 in abutment with the conveyor belt (not shown).

Lower region 126 of the base member 122 comprises a cylindrical body portion 132 configured to receive at least a portion of the upper region 124 of the base member therein, a flange 128 located at an end of the lower region of the base member to which the upper region of the base member may be attached, a first bearing surface 127 and a second bearing surface 129, and a biasing member 134 in the form of a return spring member bearing against the first bearing surface 127 and the second bearing surface 129. A pin member 142 extending outwardly from the upper region engages with a longitudinally extending groove 144 located in the cylindrical body portion 132 enabling the upper region 124 of the base member to move relative to the lower region 126 of the base member along the longitudinal axis of the cleaning assembly 122 without substantial lateral or rotational movement. In use, it is envisaged that the upper region 124 of the base member is precluded from separating fully from the lower region 126 of the base member or rotating relative thereto when the cleaning assembly is in abutment with the conveyor belt.

The upper region 126 of the base member may comprise a housing portion 146 configured to at least partially retain the actuation device 130 therein, a mounting portion 140 attached to an upper surface of the housing portion 146 and configured to mount the blade mounting assembly 150 thereon and enable rotational movement of the blade mounting assembly 150, and an actuation device 130 configured to provide linear motion of the blade mounting assembly 150. An adjustment member 158 may be used to adjust the rotational movement of the blade mounting assembly 150.

In use, it is envisaged that actuation device 130 is pressurised by the pressurised fluid located in elongate support member 110. Actuation of the actuation device 130 causes it to extend, resulting in linear movement of upper region 124 of base member 122 relative to lower region 126 of base member 122 and consequential movement of blade mounting assembly 150 along the same axis causing scraper blade 152 to contact a portion of the conveyor belt (not shown). As the pressure on actuation device 130 is relieved, return spring member 134, which biases the upper region of the base member into a retracted condition, pulls upper region 124 of base member 122 towards lower region 126 of base member 122 and consequentially disengages blade mounting assembly 150 from the conveyor belt (not shown).

Cleaning assembly 120 is provided with a pressure sensor 184 to monitor hydraulic oil pressure and a linear rail and sensor 186 to monitor wear in the scraper blade 152 and conveyor belt (not shown). Each sensor or measuring device 184, 186 is connected to one or more electrical ports 188 located at one end of the elongate support member 110 via one or more cables, wires or cords 190 and indirectly connected to a control room monitor (not shown).

Blade mounting assembly 150 is connected to mounting portion 140 located on upper region 124 of base member 122 via connection portion 160 located on a lower region of blade mount member 154. Blade mounting assembly 150 is self-compensating and rotates relative to mounting portion 140 in response to a configuration of the conveyor belt (not shown) to help maintain correct alignment and tension of scraper blade 152 relative to the conveyor belt (not shown). Blade mounting assembly 150 may move in a rocking motion up to about an 8° angle, and preferably about a 4° angle, relative to the mounting portion 140 by rotating about adjustment member 158. Adjustment member 158 may be used to adjust the rotational movement of the blade mounting assembly 150. Blade mounting assembly 150 comprises a scraper blade 152 resiliently mounted to an upper region of blade mount member 154 via a resilient member 156. Scraper blade 152 is mounted to the side of the blade mount member 154 opposing the side to which connection portion 160 is attached. In use, it is envisaged that resilient member 156 may provide yielding support to scraper blade 152, such that scraper blade 152 may flex and conform to minor irregularities and movement in the conveyor belt.

Figure 8C:
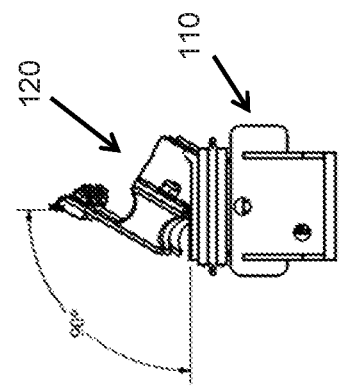
Figure 8A:
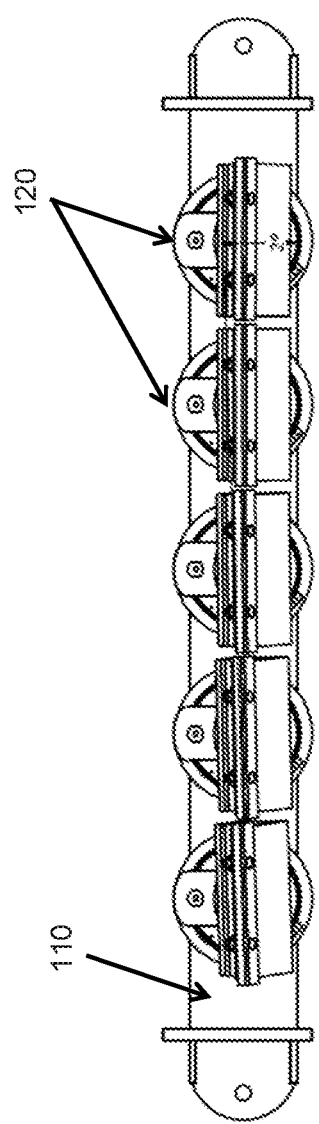
Figure 8C:
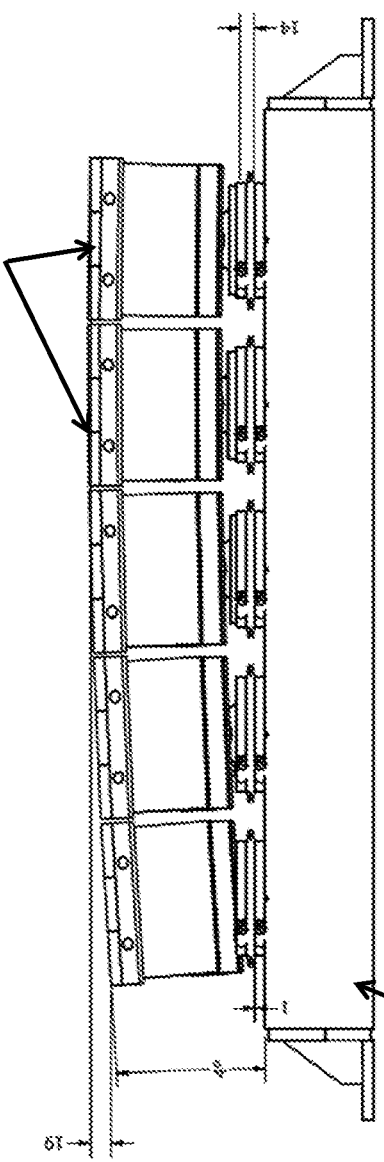

In FIGS. 8A-C, a conveyor belt cleaning apparatus 200 according to an embodiment of the invention is shown in use. Individual cleaning assemblies 120 may freely rock back and forth and move up and down such that the scraper blades conform with a worn belt profile of conveyor belt 90. As each individual cleaning assembly 120 rocks back and forth to conform with the profile of conveyor belt 90, it also angles itself diagonally across conveyor belt 90 due to the blade mount member being oriented at about a 25° angle in relation to the piston block. It is envisaged that this may increase cleaning performance and is gentle on the belt resulting in less belt wear.

Figure 9:
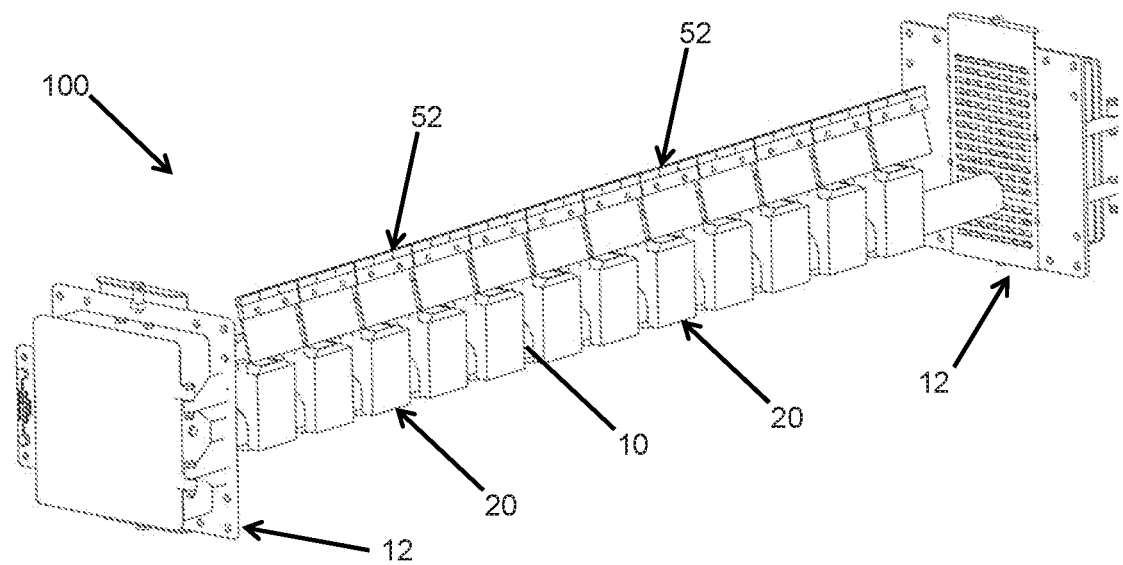
FIG. 9 shows a top perspective view of a conveyor belt cleaning apparatus according to an embodiment of the invention.
Figure 10:
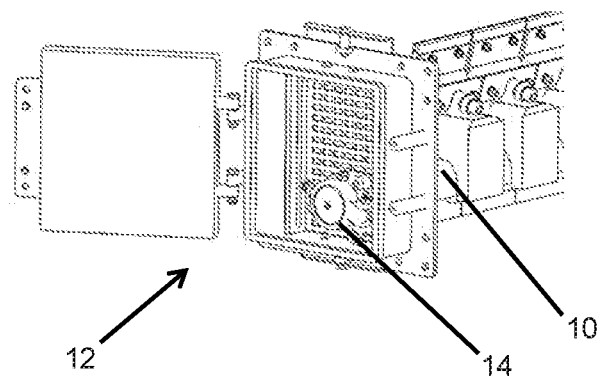
FIG. 10 shows a top perspective view of an access opening of a conveyor belt cleaning apparatus according to an embodiment of the invention.

In FIGS. 9 and 10, a conveyor belt cleaning apparatus 100 according to an embodiment of the invention is shown. Conveyor belt cleaning apparatus 100 comprises an elongate support member 10 and a plurality of cleaning assemblies 20, wherein each of the plurality of cleaning assemblies 20 is adapted to maintain the respective scraper blades 52 in abutment with a conveyor belt (not shown). It is envisaged that in use, each of the scraper blades 52 are individually maintained in the correct alignment and tension with the conveyor belt (not shown) through movement of the respective cleaning assemblies 20. Further, it is envisaged that, in use, the attack angle formed by scraper blades 52 relative to the conveyor belt (not shown) is adjusted through rotational movement of the elongate support member 10.

Conveyor belt cleaning apparatus 100 comprises an access opening 12 at each end of the apparatus in the form of a dual inspection hatch comprising a sealed door with safety mesh door. Conveyor belt cleaning apparatus 100 may be accessed through access opening 12 in order to inspect the conveyor belt cleaning operation, remove and/or replace the conveyor belt cleaning apparatus, or operate or access pumps, sensors, gauges, valves, and the like. Hand operable pump 14 is provided at an end of elongate support member 10 to allow an operator to pressurise the accumulator (not shown) and/or the conveyor belt cleaning apparatus 100.

Figure 11:
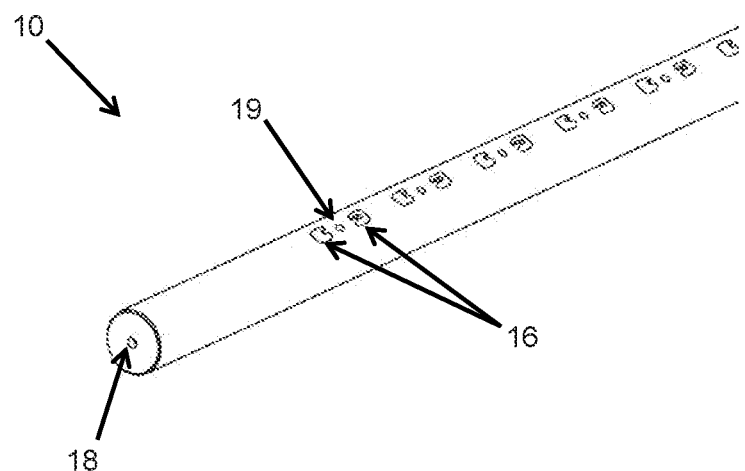
FIG. 11 shows a top perspective view of an elongate support member according to an embodiment of the invention.
Figures 12, 13:
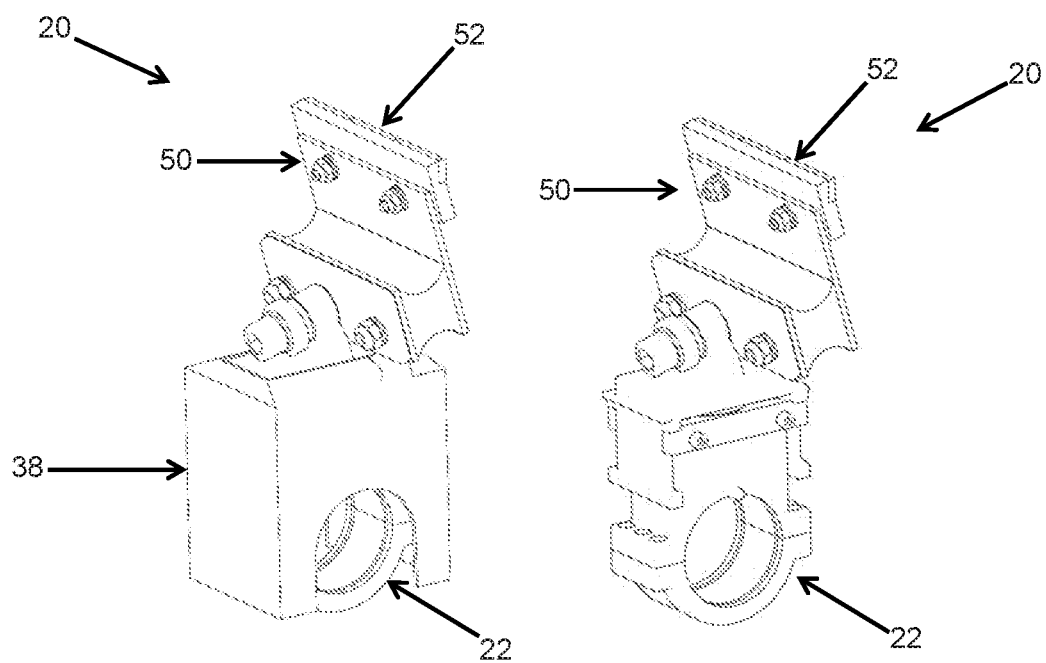
FIG. 12 shows a rear perspective view of a cleaning assembly according to an embodiment of the invention.
FIG. 13 shows a rear perspective view of a cleaning assembly according to an embodiment of the invention.
Figure 14:
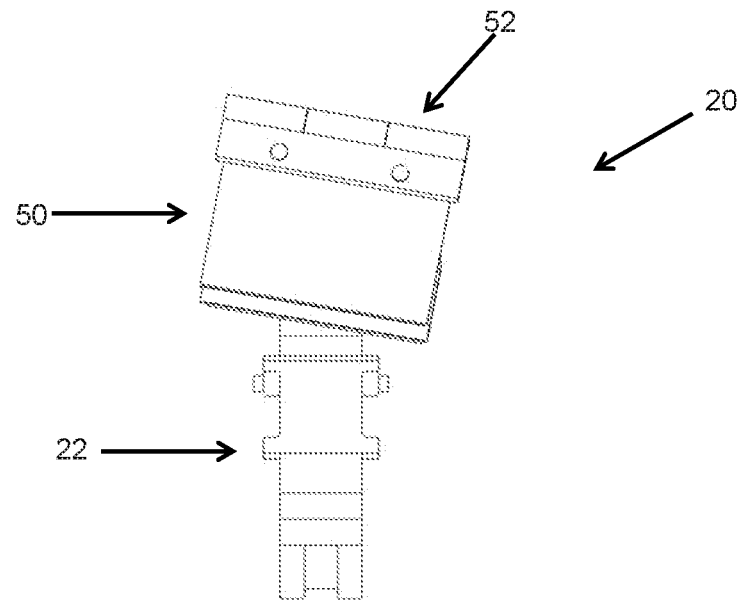
FIG. 14 shows a front view of a cleaning assembly according to an embodiment of the invention.
Figure 15:
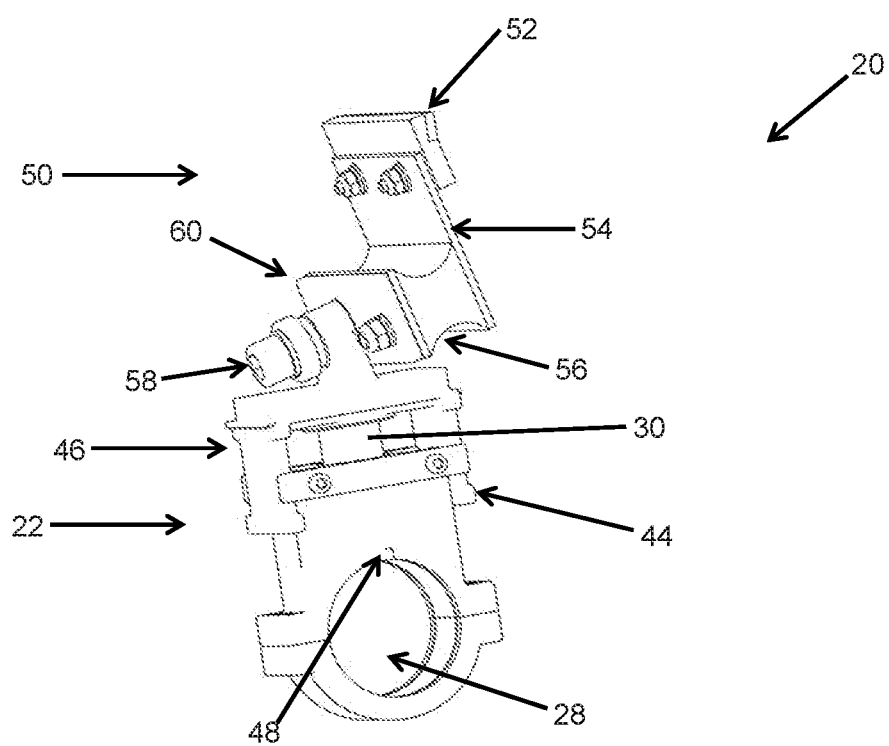
FIG. 15 shows a side view of a cleaning assembly according to an embodiment of the invention.
Figure 16:
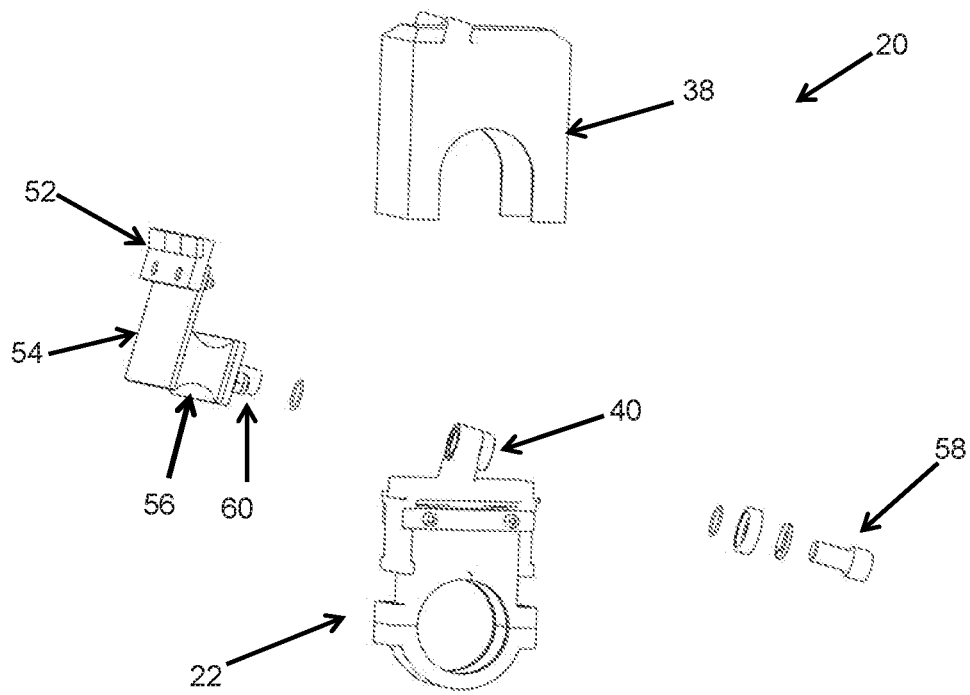
FIG. 16 shows an exploded side view of a cleaning assembly according to an embodiment of the invention.

In FIG. 11, an elongate support member 10 according to an embodiment of the invention is shown. Elongate support member 10 comprises a support member fluid inlet 18 configured to receive a pressurised fluid, such as a pneumatic or hydraulic fluid and a plurality of support member fluid outlets 19 configured to supply a pressurised fluid to a cleaning assembly (not shown) mounted to the elongate support member 10. Elongate support member 10 is provided with a plurality of receiving portions 16 configured to receive a locking member (not shown) associated with a cleaning assembly (not shown) to removably mount a cleaning assembly to the elongate support member 10. In use, it is envisaged that when the locking member of the cleaning assembly is engaged with the receiving portion on the elongate support member, the cleaning assembly is precluded from independent movement relative to the elongate support member.

In FIGS. 12 to 16, a cleaning assembly 20 for cleaning a conveyor belt according to an embodiment of the invention is shown. Cleaning assembly 20 comprises a base member 22 adapted to be mounted relative to a conveyor belt (not shown) and a blade mounting assembly 50 associated with base member 22 and adapted for mounting a scraper blade 52 thereto, wherein the blade mounting assembly 50 is configured for rotational movement relative to the base member 22. Cleaning assembly 20 is configured to maintain the scraper blade 52 in abutment with the conveyor belt. Cleaning assembly 20 may comprise a base member cover 38.

Base member 22 comprises an upper region 24 and a lower region 26, wherein lower region 26 is configured to mount the cleaning assembly 20 to the elongate support member 10 and wherein the upper region 24 may be associated with a blade mounting assembly 50. Lower region 26 and upper region 24 of base member 22 are separate, cooperating portions, wherein stop members 44 provided on a surface of lower region 26 engage with at least a portion of upper region 24 and prevent upper region 24 from separating fully from lower region 26.

Upper region 24 comprises a housing portion 46 which is configured to at least partially retain an actuation device 30 therein. Actuation device 30 abuts an upper portion of the housing portion 46 and actuation of actuation device 30 results in linear movement of the housing portion 30 relative to lower region 26 of base member 22 and consequential linear movement of blade mounting assembly 50 relative to the base member. In this way, it is envisaged that actuation of the actuation device 30 maintains scraper blade 52 in abutment with a conveyor belt (not shown) at the correct tension to effectively clean the conveyor belt.

Blade mounting assembly 50 is connected to mounting portion 40 located on upper region 26 of base member 22 via connection portion 60 located on a lower region of mounting portion 54. Blade mounting assembly 50 is self-compensating and rotates relative to mounting portion 40 in response to a configuration of the conveyor belt (not shown) to help maintain correct alignment and tension of scraper blade 52 relative to the conveyor belt (not shown). Blade mounting assembly 50 may move in a rocking motion up to 5° relative to the mounting portion. Adjustment member 58 may be used to adjust the rotational movement of the blade mounting assembly 50. Blade mounting assembly 50 comprises a scraper blade 52 resiliently mounted to an upper region of blade mount member 54 via a resilient member 56. Scraper blade 52 is mounted to the side of the blade mount member 54 opposing the side to which connection portion 60 is attached. In use, it is envisaged that resilient member 56 may provide yielding support to scraper blade 52, such that scraper blade 52 may flex and conform to minor irregularities and movement in the conveyor belt.

Figure 17:
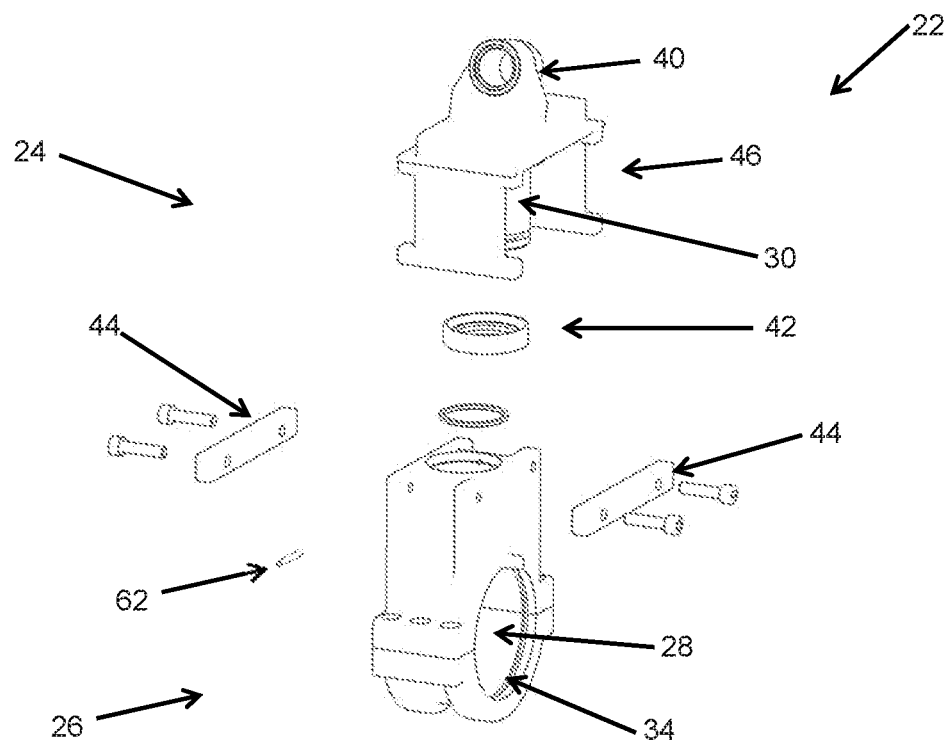
FIG. 17 shows an exploded front perspective view of a base member of a cleaning assembly according to an embodiment of the invention.
Figure 18:
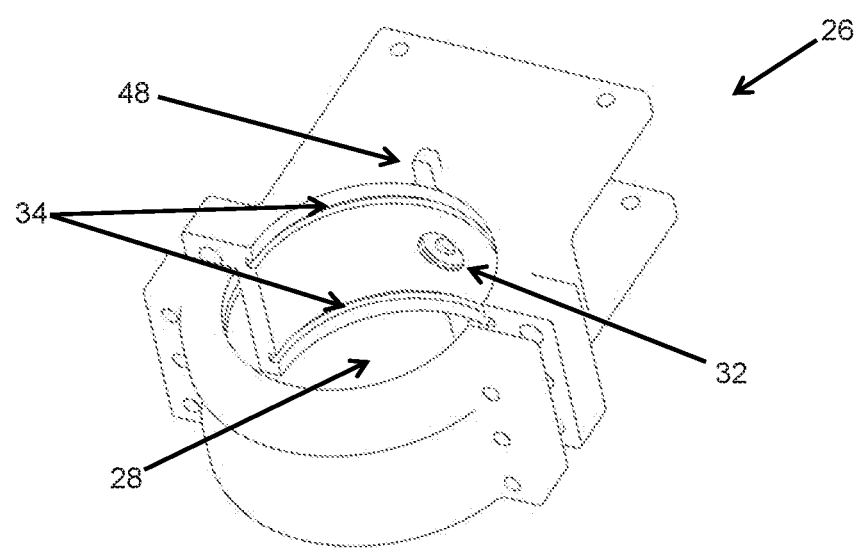
FIG. 18 shows a side view of a lower region of a base member of a cleaning assembly according to an embodiment of the invention.

In FIGS. 17 and 18, a base member 22 of a cleaning assembly 20 according to an embodiment of the invention is shown. Base member 22 comprises an upper region 24 comprising a housing portion 46, a mounting portion 40 attached to an upper surface of housing portion 46, and an actuation device 30 located at least partially in housing portion 46, and a lower region 26 comprising an opening 28. Actuation device fluid inlet 32 of actuation device 30 is in fluid communication with a support member fluid outlet 19 of elongate support member 10). Actuation device 30 may be provided with one or more sealing members 42 and one or more bleed screws 62. Opening 28 is provided with one or more sealing members 34 located in annular grooves in the bore of opening 28 to provide a seal against leaking pressurised fluid and/or ingress of water and debris into a gap located between an outer surface of the elongate support member 10 and the bore of opening 28.

Base member 22 comprises two cooperating portions formed by splitting base member 22 in the region of opening 28, from the first end of opening 28 to the opposed second end of opening 28. The upper portion the split base member thereof is fixed to an upper surface of the elongate support member 10 by engaging one or more locking members 48 with complementary receiving portions 16 located on a surface of the elongate support member 10. Actuation device fluid inlet 32 and support member fluid outlet 19 mate to form a fluid communication. The lower portion of the split base member is then fitted to the underside of the elongate support member 10 and fastened to the upper portion of the split base member by one or more mechanical fasteners. In this way, opening 28 of base member 22 is configured to receive at least a portion of the elongate support member 10 therein.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A cleaning assembly for cleaning a conveyor belt, the cleaning assembly comprising:
   a base member adapted to be mounted relative to the conveyor belt; and
   a blade mounting assembly associated with the base member and adapted for mounting a scraper blade thereto, wherein the blade mounting assembly is configured for rotational movement relative to the base member,
   wherein the cleaning assembly is configured to maintain the scraper blade in abutment with the conveyor belt, and
   wherein the base member comprises:
      an upper region, wherein the upper region of the base member is associated with a blade mounting assembly, and
      a lower region, wherein the lower region of the base member is associated with an elongate support member,
      wherein the base member and the elongate support member are in fluid communication, and the elongate support member comprises a sealing member to maintain fluid pressure with the base member.

2. The cleaning assembly for cleaning a conveyor belt of claim 1, wherein the base member comprises:
   a biasing member, wherein the biasing member biases the base member into a retracted condition, and
   an actuation device,
   wherein actuation of the actuation device results in linear movement of the blade mounting assembly relative to the base member, such that the scraper blade is maintained in abutment with the conveyor belt.

3. The cleaning assembly for cleaning a conveyor belt of claim 1, wherein the blade mounting assembly comprises an adjustment member, wherein the adjustment member facilitates the rotational movement of the blade mounting assembly relative to the base member, such that the scraper blade is maintained in abutment with the conveyor belt.

4. The cleaning assembly for cleaning a conveyor belt of claim 1,
wherein the blade mounting assembly comprises a resilient member,
wherein the resilient member provides yielding support to the scraper blade, such that the scraper blade is maintained in abutment with the conveyor belt.

5. The cleaning assembly for cleaning a conveyor belt of claim 1, further comprising one or more sensors and/or measuring devices configured to monitor conveyor belt and/or scraper blade wear.

6. The conveyor belt cleaning apparatus of claim 5, wherein the elongate support member comprises one or more bores extending transversely to the longitudinal axis of the elongate support member and wherein the base member of each of the plurality of cleaning assemblies is configured to be at least partially received within the transverse bore.

7. A conveyor belt cleaning apparatus comprising:
an elongate support member; and
a plurality of cleaning assemblies, each of the plurality of cleaning assemblies comprising:
a base member associated with the elongate support member, wherein the base member and the elongate support member are in fluid communication, and the elongate support member comprises a sealing member to maintain fluid pressure with the base member, and
a blade mounting assembly associated with the base member and adapted for mounting a scraper blade thereto, wherein the blade mounting assembly is configured for rotational movement relative to the base member,
wherein each of the plurality of cleaning assemblies is adapted to maintain the respective scraper blades in abutment with a conveyor belt.

8. The conveyor belt cleaning apparatus of claim 7, further comprising:
one or more sensors and/or measuring devices associated with the one of more of the plurality of cleaning assemblies and/or the elongate support member,
wherein the one or more sensors and/or measuring devices are configured to monitor conveyor belt wear and/or scraper blade wear and/or the operation of the conveyor belt cleaning apparatus.

9. The conveyor belt cleaning apparatus of claim 7,
wherein the elongate support member comprises a bore configured to comprise one or more conduits therein, and
wherein the bore and/or one or more conduits in the bore are in fluid communication with a source of fluid.

10. The conveyor belt cleaning apparatus of claim 7, wherein at least a portion of each of the plurality of cleaning assemblies and at least a portion of the elongate support member comprises cooperating shapes.

11. The conveyor belt cleaning apparatus of claim 7, wherein the base member of each of the plurality of cleaning assemblies is configured to be at least partially received within a portion of the elongate support member.

12. The conveyor belt cleaning apparatus of claim 7, further comprising a spray bar and one or more nozzles configured to disperse a liquid onto a surface of the conveyor belt.

13. The conveyor belt cleaning apparatus of claim 7, further comprising one or more stabilising rollers configured to hold the conveyor belt down and optimise conveyor belt contact with the scraper blades.

* * * * *